United States Patent
Inoue et al.

(10) Patent No.: US 8,339,925 B2
(45) Date of Patent: Dec. 25, 2012

(54) OPTICAL INFORMATION RECORDING/REPRODUCING OPTICAL SYSTEM AND OPTICAL INFORMATION RECORDING/REPRODUCING APPARATUS

(75) Inventors: Satoshi Inoue, Saitama (JP); Yuta Yoshida, Saitama (JP); Naoto Hashimoto, Tochigi (JP); Suguru Takishima, Tokyo (JP)

(73) Assignee: Hoya Corporation, Tokyo (JP)

( * ) Notice: Subject to any disclaimer, the term of this patent is extended or adjusted under 35 U.S.C. 154(b) by 205 days.

(21) Appl. No.: 12/893,382

(22) Filed: Sep. 29, 2010

(65) Prior Publication Data

US 2011/0075542 A1    Mar. 31, 2011

(30) Foreign Application Priority Data

Sep. 30, 2009   (JP) ................................ 2009-225780
Jul. 29, 2010   (JP) ................................ 2010-169908

(51) Int. Cl.
*G11B 7/00* (2006.01)
(52) U.S. Cl. .............. 369/112.23; 369/112.01; 359/355; 359/359; 359/580; 359/581
(58) Field of Classification Search ............. 369/112.01, 369/112.23; 359/355, 359, 580, 581; 430/270.11
See application file for complete search history.

(56) References Cited

U.S. PATENT DOCUMENTS

| | | | |
|---|---|---|---|
| 7,372,798 B2 * | 5/2008 | Taguchi et al. ........... | 369/112.28 |
| 2005/0201422 A1 | 9/2005 | Ohta et al. | |
| 2005/0219683 A1 | 10/2005 | Ohta et al. | |
| 2005/0225879 A1 | 10/2005 | Ohta et al. | |
| 2008/0212452 A1 | 9/2008 | Hotta et al. | |

FOREIGN PATENT DOCUMENTS

| | | |
|---|---|---|
| JP | 2005-251354 | 9/2005 |
| JP | 2005-266780 | 9/2005 |
| JP | 2005-302088 | 10/2005 |
| JP | 2005-317186 | 11/2005 |
| JP | 2008-217886 | 9/2008 |
| JP | 2009-37666 | 2/2009 |

OTHER PUBLICATIONS

U.S. Appl. No. 12/893,268 to Satoshi Inoue et al., which was filed on Sep. 29, 2010.
U.S. Appl. No. 12/893,332 to Satoshi Inoue et al., which was filed on Sep. 29, 2010.

* cited by examiner

*Primary Examiner* — Wayne Young
*Assistant Examiner* — Brenda Bernardi
(74) *Attorney, Agent, or Firm* — Greenblum & Bernstein P.L.C.

(57) ABSTRACT

An optical information recording/reproducing optical system, comprising a light source; an optical element converting a laser beam into a substantially collimated beam; and an objective lens, wherein a wavelength λ (unit: nm) of the laser beam falls within a range of 400<λ<410, the optical element and the objective lens are made of same resin materials or different resin materials having a glass transition temperature of Tg>115° C., each of optical surfaces is configured not to have an optical thin film which contains at least one of or elements of titanium, tantalum, hafnium, zirconium, niobium, molybdenum and chromium, each of optical surfaces of the optical element is provided with an antireflection film made of one of or a mixture of at least two of silicon oxide, aluminum oxide, aluminum fluoride and magnesium fluoride, and a following condition is satisfied $$\prod_{i=1}^{n-1}\left(1-\frac{R_{(BL)i}}{100}\right) - \prod_{i=1}^{n-1}\left(1-\frac{R_{(UV)i}}{100}\right) > 0.05.$$

20 Claims, 2 Drawing Sheets

OPTICAL INFORMATION RECORDING/REPRODUCING OPTICAL SYSTEM AND OPTICAL INFORMATION RECORDING/REPRODUCING APPARATUS

BACKGROUND OF THE INVENTION

The present invention relates to an optical information recording/reproducing optical system and an optical information recording/reproducing apparatus for recording information to and/or reproducing information from an optical disc based on a predetermined standard by irradiating an information recording layer of the optical disc with a laser beam, and particularly to an optical information recording/reproducing optical system and an optical information recording/reproducing apparatus suitable for information recording/reproducing for a high-recording density optical disc, such as BD (Blu-ray Disc).

There exist various standards of optical discs, such as CD (Compact Disc) and DVD (Digital Versatile Disc), differing in recording density, protective layer thickness, etc. Meanwhile, high-recording density optical discs (e.g., BD), having still higher recording density than DVD, are being brought into practical use in recent years to realize still higher information storage capacity. Incidentally, in this specification, the "optical information recording/reproducing apparatuses" include apparatuses for both information reproducing and information recording, apparatuses exclusively for information reproducing, and apparatuses exclusively for information recording, and the same thing can be said for the "optical information recording/reproducing optical systems". In the following, the "optical system for optical information recording/reproducing apparatuses" is frequently referred to as an optical system of an optical pick-up.

When information recording or information reproducing for an optical disc is executed in the optical information recording/reproducing apparatus, undesired reflected light or scattered light, which are generated on optical surfaces of optical elements (e.g., an objective lens and a collimator lens configuring an optical system of an optical pick-up) may interfere with signal light, and thereby deteriorate the quality of the signal light which is used for information recording or information reproducing. For this reason, in many cases, a functional film, such as an antireflection film or an antistatic film for preventing adhesion of dust to an optical surface, is provided on an optical surface of an optical element (e.g., an objective lens) configuring an optical system of an optical pick-up.

Incidentally, laser light having a wavelength of approximately 400 nm (hereafter, referred to as "blue laser light") is used for information recording and information reproducing for the high-recording density optical disc, such as BD. Since laser light having such a short wavelength has high photon energy and the laser light chemically affects material forming an optical element, the quality of the material forming the optical element tends to be changed when the laser beams passes through the optical element.

For this reason, if a resin lens coated with an antireflection film is irradiated, in an high temperature environment, with the laser light having a short wavelength and having a power density larger than or equal to a predetermined level, a minute change in shape of the coated optical surface of the resin lens occurs depending on the intensity distribution of the laser light with which the optical surface is irradiated, and thereby the optical performance of the resin lens (e.g., aberrations and optical efficiency) deteriorates.

Japanese Patent Provisional Publication No. 2005-251354A (hereafter, referred to as JP2005-251354A) suggests changing the resin base material of an optical element, as a measure against the above described problem.

More specifically, in JP2005-251354A, a technique in which resin having an alicyclic structure is used as the resin base material to reduce the degree of adhesiveness with respect to a functional film is suggested. However, it should be noted that the resin material is one of most important optical design parameters defining the optical performance of the optical element (i.e., the optical performance of an optical system of an optical pick-up). Therefore, it is not desirable to limit a selection range of resin materials. That is because the degree of design freedom reduces. In actuality, an optical configuration suggested in JP2005-251354A is not able to realize the optical performance required for an optical system of an optical pick-up for BD. In addition, the optical configuration suggested in JP2005-251354A is not able to achieve a sufficient light-resisting property.

SUMMARY OF THE INVENTION

The present invention is advantageous in that it provides an optical information recording/reproducing optical system and an optical information recording/reproducing apparatus having a sufficient light-resisting property in a high temperature environment while securing an adequate degree of design freedom for achieving required optical performance.

According to an aspect of the invention, there is provided an optical information recording/reproducing optical system for recording information to and/or reproducing information from an optical disc by letting a laser beam impinge on a recording layer of the optical disc, comprising: a light source that emits the laser beam; an optical element that converts the laser beam emitted by the light source into a substantially collimated beam; and an objective lens that converges the laser beam emerging from the optical element onto the recording layer of the optical disc. In this configuration, a wavelength $\lambda$ (unit: nm) of the laser beam falls within a range defined by a following condition: $400<\lambda<410$ . . . (1). The optical element and the objective lens are made of same resin materials or different resin materials having a glass transition temperature Tg satisfying a condition: $Tg>115°$ C. . . . (2). Each of optical surfaces of the optical element and the objective lens is configured not to have an optical thin film which contains at least one of elements of titanium (Ti), tantalum (Ta), hafnium (Hf), zirconium (Zr), niobium (Nb), molybdenum (Mo) and chromium (Cr). Each of optical surfaces of the optical element is provided with an antireflection film which is made of one of silicon oxide, aluminum oxide, aluminum fluoride and magnesium fluoride or a mixture of at least two of silicon oxide, aluminum oxide, aluminum fluoride and magnesium fluoride. When optical surfaces are defined as i-th surfaces (i=1, 2, 3, . . . , n) from an optical surface to which the light beam emerging from the light source enters and an exit surface of the objective lens, a reflectivity defined when light having a wavelength $\lambda_{UV}$ ($\lambda_{UV}$=365 nm) is incident perpendicularly on i-th optical surface is represented as $R_{UVi}$ (unit: %) and a reflectivity defined when light having a wavelength $\lambda_{BL}$ ($\lambda_{BL}$=405 nm) is incident perpendicularly on i-th optical surface is represented as $R_{BLi}$ (unit: %), the optical information recording/reproducing optical system satisfies a condition:

$$\prod_{i=1}^{n-1}\left(1-\frac{R_{(BL)i}}{100}\right)-\prod_{i=1}^{n-1}\left(1-\frac{R_{(UV)i}}{100}\right) > 0.05. \quad (3)$$

As described above, a problem associated with a light-resisting property of an optical system of an optical pick-up is that a minute change in shape occurs on an optical surface on which a functional film, such as an antireflection film, is provided and therefore the optical performance (e.g., aberrations) is deteriorated. Such a change in shape occurs frequently when the optical surface is coated with a functional film containing an element (e.g., titanium) for providing a compound having photocatalysis. This suggests that one of factors of the change in shape is the photocatalysis. Furthermore, the change in shape of the optical surface does not occur during storage in a high temperature environment nor in a state of blue laser irradiation at a room temperature, but the change in shape of the optical surface occurs only in a state of blue laser irradiation in a high temperature environment. Therefore, as a measure against the change in shape by blue laser irradiation in a high temperature environment, it is required to provide not only a measure against the photocatalysis but also a measure concerning durability in a high temperature environment. In the above described configuration of the optical information recording/reproducing optical system, the durability in a high temperature environment is enhanced by employing the resin having a glass transition temperature higher than 115° C. as material of the optical element and the objective lens, and the change in shape of the optical surface is prevented by avoiding use of elements associated with the photocatalysis, such as titanium, as material of the antireflection film. The material such as silicon oxide and aluminum oxide do not cause the phtocatalysis. Therefore, an antireflection film made of the silicon oxide or aluminum oxide can hardly cause the alteration and the change in shape with respect to the base material. Furthermore, since the antireflection film made of the silicon oxide or aluminum oxide exhibits a certain degree of difference in refractive index between layers forming the antireflection film, it is possible to relatively easily obtain an antireflection film which is able to achieve desirable optical performance, for example, with a relatively small number of layers.

In order to enhance the light-resisting property while keeping basic optical performance, it is necessary to suppress the amount of light of the wavelength $\lambda_{UV}$ functioning as noise light which causes the change in shape of the optical surface, relative to the amount of light of the wavelength $\lambda_{BL}$ which is signal light incident on an exit surface (n-th surface) of the objective lens. Since the wavelength $\lambda_{BL}$ ($\lambda_{BL}$=405 nm) and the wavelength $\lambda_{UV}$ ($\lambda_{UV}$=365 nm) are close to each other, the base resin material exhibits no substantial difference between the internal transmissivity at the wavelength $\lambda_{BL}$ and the internal transmissivity at the wavelength $\lambda_{UV}$. In the above described configuration, the amount of light of the wavelength $\lambda_{UV}$ is suppressed by setting a cumulative surface transmissivity difference (i.e., a value obtained by subtracting an accumulated value of the surface transmissivities at the wavelength $\lambda_{UV}$ from an accumulated value of the surface transmissivities at the wavelength $\lambda_{BL}$) defined by the left side term of the condition (3) to be larger than 5%. Therefore, according to the above described configuration, it is possible to provide an optical information recording/reproducing apparatus which is capable of achieving an excellent light-resisting property in a high temperature environment while keeping the adequate basic performance.

In at least one aspect, the optical information recording/reproducing optical system may further satisfy a condition:

$$\prod_{i=1}^{n}\left(1-\frac{R_{(BL)i}}{100}\right) > 0.90. \quad (4)$$

By satisfying the condition (4), an adequate light amount can be secured for the light beam having the wavelength $\lambda_{BL}$ used for information recording and information reproducing for the optical disc, and the optical information recording/reproducing optical system capable of achieving an excellent operation stability can be provided. If the condition (4) is not satisfied, the antireflection film does not work appropriately, and therefore it becomes necessary to use a high output power laser is required to amplify the signal intensity, which leads to increase of cost.

In at least one aspect, at least one of optical surfaces of the objective lens is provided with an antireflection film which includes at least a layer made of one of silicon oxide, aluminum oxide, aluminum fluoride and magnesium fluoride or a mixture of at least two of silicon oxide, aluminum oxide, aluminum fluoride and magnesium fluoride.

In at least one aspect, the antireflection film of each of the optical surfaces of the optical element and the objective lens may be one of a single layer film and a multilayer film with four layers or less. If the antireflection film is formed to be a multilayer film of five layers or more, the man-hour in a manufacturing process increases and the manufacturing cost increases. Furthermore, if the antireflection film provided on the light-incident side of the objective lens is a multilayer film of five layers or more, the waveform of the reflection spectrum defined when the incident angle changes becomes complicated. Therefore, minute fringes occur in the intensity distribution of the reflected light beam or the transmitted light beam at a central part or a peripheral part of the intensity distribution. From findings of the inventors of the present invention, a profile of change in shape occurring on the optical surface is determined by a profile of the intensity distribution of the light beam with which the optical surface is irradiated. In other words, the change in shape having a profile like a transferred shape of the intensity distribution of the light beam incident on the optical surface appears on the optical surface. Therefore, if such a change in shape of the optical surface occurs when the multilayer film of five layers or more is used, a fringe-like deformation occurs on the optical surface, and thereby the optical performance (e.g., aberrations) deteriorates considerably. By using a single layer film or a multilayer film of four layers or less, the intensity distribution of each of the reflected light beam and the transmitted light beam has a relatively smooth profile. Therefore, even if the change in shape occurs on the optical surface, the degree of deterioration of the optical performance (e.g., the aberrations) is moderate.

In at least one aspect, the optical information recording/reproducing optical system may further include a diffraction grating that divides the laser beam from the light source into a plurality of diffracted light beams. The diffraction grating is located between the light source and the optical element.

When an optical system has a diffraction grating, a minute stripe pattern is given to the intensity distribution of the light beam by the diffraction grating. Therefore, in such an optical system, the change in shape tends to occur on an optical surface and thereby the optical performance tends to decrease considerably. In this regard, by applying the above described configuration to such an optical system including the diffraction grating, the light-resisting property of the optical system can be improved remarkably.

In at least one aspect, the antireflection film formed on the exit surface of the objective lens is configured such that, within a wavelength range of 350 nm to 750 nm, a wavelength λmin (unit: nm) at which a reflectivity of the antireflection film formed on the exit surface becomes smallest in a state where the laser beam is incident on the antireflection film formed on the exit surface perpendicularly satisfies a condition:

$$430 < \lambda min < 600 \quad (7).$$

The wavelength at which the reflectivity takes a minimum value becomes shorter, as the incident angle of the light beam to the functional film becomes larger. By satisfying the condition (7), the reflectivity at the wavelength $\lambda_{BL}$ can be suppressed to a small level within a range from the center position where the laser beam is incident on the film perpendicularly to the peripheral position where the laser beam is incident on the film obliquely. Therefore, the transmissivity of the light beam of the wavelength $\lambda_{BL}$ exiting from the objective lens becomes high, and it becomes possible to secure an adequate light amount of the light beam of the wavelength $\lambda_{BL}$. By contrast, if the condition (7) is not satisfied (i.e., λmin gets higher than the upper limit of the condition (6) or λmin gets lower than the lower limit of the condition (6)), the light amount of the light beam of the wavelength $\lambda_{BL}$ decreases undesirably.

In at least one aspect, the antireflection film formed on at least one of the optical surfaces of the optical element may be a three-layer film. In this case, when layers of the three-layer film are first, second and third layers defined in this order from a base material surface side of the optical element, n1, n2 and n3 respectively represent refractive indexes of materials of the first, second and third layers at a wavelength of $\lambda_{BL}$, and d1, d2 and d3 (unit: nm) respectively represent thicknesses of the first, second and third layers, the refractive indexes n1, n2 and n3 and the thicknesses d1, d2 and d3 may satisfy following conditions:

| first layer: | $1.55 \geq n1$, | $30 \leq d1 \leq 150$ |
| second layer: | $1.55 < n2 \leq 1.70$, | $40 \leq d2 \leq 100$ |
| third layer: | $1.55 \geq n3$, | $30 \leq d3 \leq 150$. |

By providing the antireflection film having the above described structure on the optical element, it becomes possible to obtain an appropriate cumulative surface transmissivity difference and an appropriate cumulative surface transmissivity at the wavelength $\lambda_{BL}$. Since the antireflection film has an adequate amount of refractive index difference (difference in refractive index between layers), required optical performance can be achieved. Therefore, it becomes possible to achieve the optical information recording/reproducing optical system having an excellent light-resisting property.

In at least one aspect, the antireflection film formed on at least one of the optical surfaces of the objective lens may be a three-layer film. In this case, when layers of the three-layer film are fourth, fifth and sixth layers defined in this order from a base material surface side of the objective lens, n4, n5 and n6 respectively represent refractive indexes of materials of the fourth, fifth and sixth layers at a wavelength of $\lambda_{BL}$, and d4, d5 and d6 (unit: nm) respectively represent thicknesses of the fourth, fifth and sixth layers, the refractive indexes n4, n5 and n6 and the thicknesses d4, d5 and d6 may satisfy following conditions:

| fourth layer: | $1.55 \geq n4$, | $30 \leq d4 \leq 200$ |
| fifth layer: | $1.55 < n5 \leq 1.70$, | $30 \leq d5 \leq 100$ |
| sixth layer: | $1.55 \geq n6$, | $40 \leq d6 \leq 150$. |

By providing the antireflection film having the above described structure on the objective lens, it becomes possible to obtain an appropriate cumulative surface transmissivity difference and an appropriate cumulative surface transmissivity at the wavelength $\lambda_{BL}$. Since the antireflection film has an adequate amount of refractive index difference, required optical performance can be achieved. Therefore, it becomes possible to achieve the optical information recording/reproducing optical system having an excellent light-resisting property.

In at least one aspect, the antireflection film formed on at least one of the optical surfaces of the objective lens may be a four-layer film. In this case, when layers of the four-layer film are seventh, eighth, ninth and tenth layers defined in this order from a base material surface side of the objective lens, n7, n8, n9 and n10 respectively represent refractive indexes of materials of the seventh, eighth, ninth and tenth layers at a wavelength of $\lambda_{BL}$, and d7, d8 d9 and d10 (unit: nm) respectively represent thicknesses of the seventh, eighth, ninth and tenth layers, the refractive indexes n7, n8, n9 and n10 and the thicknesses d7, d8, d9 and d10 may satisfy following conditions:

| seventh layer: | $1.55 \geq n7$, | $10 \leq d7 \leq 100$ |
| eighth layer: | $1.55 < n8 \leq 1.70$, | $30 \leq d8 \leq 150$ |
| ninth layer: | $1.55 \geq n9$, | $40 \leq d9 \leq 100$ |
| tenth layer: | $1.55 < n10 \leq 1.70$, | $30 \leq d10 \leq 100$. |

By providing the antireflection film having the above described structure on the objective lens, it becomes possible to obtain an appropriate cumulative surface transmissivity difference and an appropriate cumulative surface transmissivity at the wavelength $\lambda_{BL}$. Since the antireflection film has an adequate amount of refractive index difference, required optical performance can be achieved. Therefore, it becomes possible to achieve the optical information recording/reproducing optical system having an excellent light-resisting property.

According to another aspect of the invention, there is provided an optical information recording/reproducing optical system for recording information to and/or reproducing information from an optical disc by letting a laser beam impinge on a recording layer of the optical disc. The optical information recording/reproducing optical system includes a light source that emits the laser beam; an optical element that converts the laser beam emitted by the light source into a substantially collimated beam; and an objective lens that converges the laser beam emerging from the optical element onto the recording layer of the optical disc. A wavelength λ (unit: nm) of the laser beam falls within a range defined by a following condition: $400 < \lambda < 410$ . . . (1). The optical element and the objective lens are made of same resin materials or different resin materials having a glass transition temperature Tg satisfying a condition: $Tg > 115°$ C. . . . (2). Each of optical surfaces of the optical element and the objective lens is configured not to have an optical thin film which contains at least one of elements of titanium (Ti), tantalum (Ta), hafnium (Hf), zirconium (Zr), niobium (Nb), molybdenum (Mo) and chromium (Cr). Each of optical surfaces of the optical element is provided with an antireflection film which is made of one of silicon oxide, aluminum oxide, aluminum fluoride and magnesium fluoride or a mixture of at least two of silicon oxide, aluminum oxide, aluminum fluoride and magnesium fluoride. When $T_{UV}$ represents an internal transmissivity defined when light having the wavelength of $\lambda_{UV}$ passes through the resin material of the optical element by a path length of 3 mm, the internal transmissivity $T_{UV}$ satisfies a condition: $T_{UV} < 0.8$ . . . (5). When optical surfaces from an optical surface to which the laser beam emerging from the light source enters to an exit surface of the objective lens are defined as i-th surfaces (i=1, 2, 3, . . . , n), a reflectivity defined when light having a wavelength $\lambda_{UV}$ ($\lambda_{UV}$=365 nm) is incident perpendicularly on i-th optical surface is represented as $R_{UVi}$ (unit: %) and a reflectivity defined when light having a wavelength $\lambda_{BL}$ ($\lambda_{BL}$=405 nm) is incident perpendicularly on i-th optical surface is represented as $R_{BLi}$ (unit: %), the optical information recording/reproducing optical system satisfies a condition:

$$\prod_{i=1}^{n-1}\left(1 - \frac{R_{(BL)i}}{100}\right) - \prod_{i=1}^{n-1}\left(1 - \frac{R_{(UV)i}}{100}\right) > 0.04. \qquad (6)$$

When the resin material forming the optical element has a lower transmissivity smaller than 80% with respect to the ultraviolet light of the wavelength $\lambda_{UV}$ to be finally suppressed, it is possible to decrease the amount of the laser light (namely the laser light of the wavelength $\lambda_{UV}$) incident on the optical surface of the objective lens which is subject to the change in shape by the light of the wavelength of $\lambda_{UV}$. Therefore, even if the cumulative surface transmissivity difference is suppressed to a value close to 4%, it is possible to effectively suppress the change in shape of the optical surface. Therefore, according to the above described configuration, it is possible to provide an optical information recording/reproducing apparatus which is capable of achieving an excellent light-resisting property in a high temperature environment while keeping the adequate basic performance. If the condition (6) is not satisfied, the change in shape of the optical surface tends to proceed due to the effect of the ultraviolet light. Alternatively, the reflectivity at the use wavelength becomes too high, and therefore the signal intensity lowers.

According to another aspect of the invention, there is provided an optical information recording/reproducing apparatus including one of the above described optical information recording/reproducing optical systems.

BRIEF DESCRIPTION OF THE ACCOMPANYING DRAWINGS

DETAILED DESCRIPTION OF THE EMBODIMENTS

Figure 1:
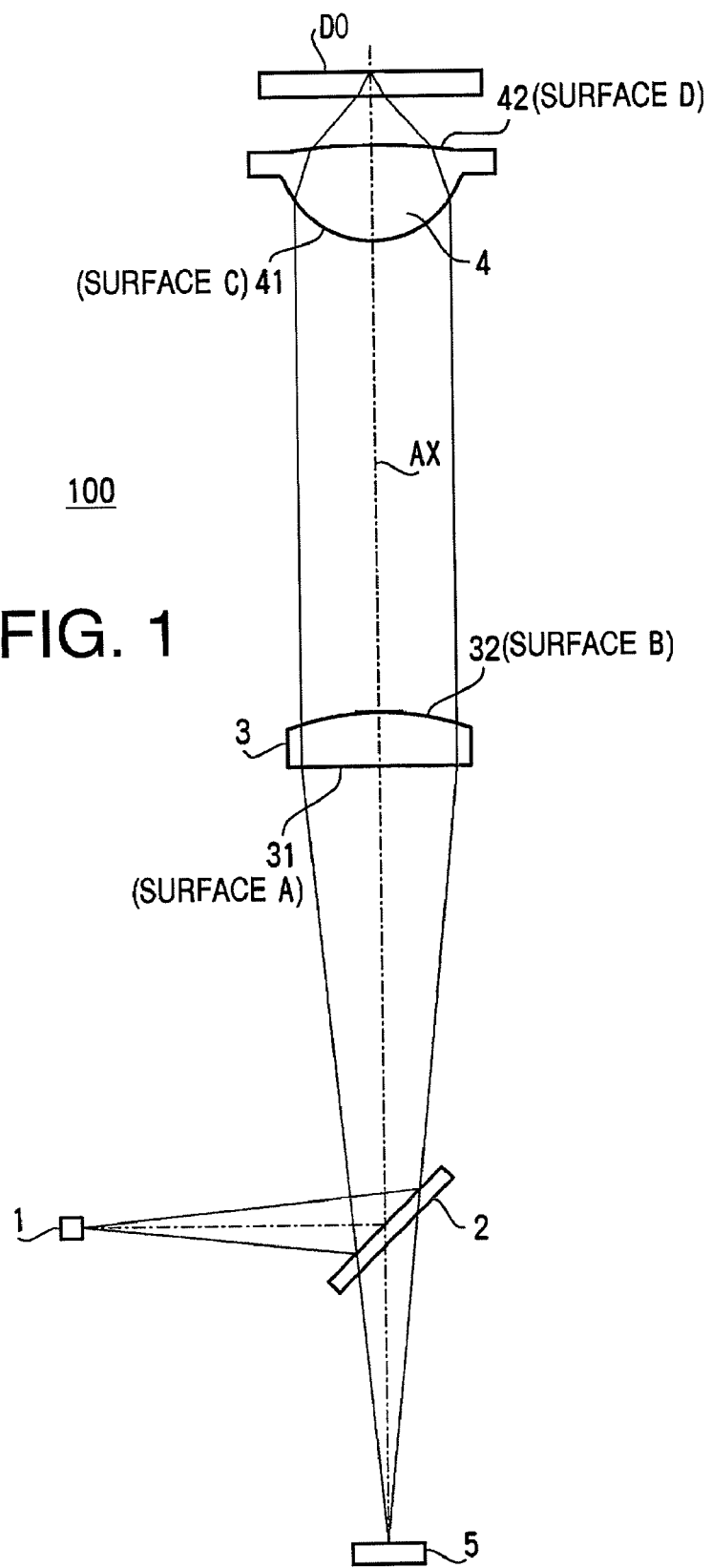
FIG. 1 is a block diagram generally illustrating a configuration of an optical system of an optical pick-up mounted on an optical information recording/reproducing apparatus according to an embodiment of the invention.

Hereinafter, an embodiment according to the invention is described with reference to the accompanying drawings.

First of all, regarding a problem associated with a light-resisting property to be solved by the present invention (i.e., deterioration of optical performance of a resin optical element on which a functional film such as an antireflection film is formed, caused when an optical surface of the optical element is irradiated with blue laser light having a strong intensity in a high temperature environment), a mechanism of the deterioration has not been sufficiently clarified yet. The present invention has been made based on a hypothetical theory about the mechanism of deterioration of the optical performance of the resin optical element explained by the inventors of the present invention through various experiments and analysis. Therefore, before explaining embodiments of the invention, findings and a hypothetical theory attained by the inventors regarding the mechanism of deterioration of optical performance (e.g., aberrations) are explained below.

According to results of the experiments conducted by the inventors, deterioration of optical performance of an optical element occurs more frequently when an optical surface of the optical element is coated with a functional film containing an element (e.g., titanium) for providing a compound having photocatalysis. Furthermore, the deterioration of the optical performance does not occur in a room temperature environment, but occurs when the optical surface is irradiated with blue laser light in a relatively high temperature environment. Regarding the lower temperature limit at which the deterioration of the optical property occurs, the deterioration of the optical performance frequently occurs at an environmental temperature higher than or equal to 70° C. although the lower temperature limit varies depending on a design condition of an optical system. It has also been found that the deterioration of the optical performance does not occur when the optical system is merely stored in a high environmental temperature. In consideration of the above described conditions of occurrence of deterioration of the optical performance, it can be considered that chemical change (alteration, decomposition, and etc.) is caused in a surface layer of a based material contacting the functional film by the photocatalysis of the functional film activated in a high temperature condition, and that the optical performance is deteriorated by resulting deformation of the optical surface and change of the refractive index or a light absorption property.

When we observe the optical surface of the optical element whose optical performance (e.g., aberrations) has been deteriorated by irradiation of blue laser, we frequently find minute bumps and dips on the optical surface. The bumps and dips formed on the optical surface correspond to a profile of the intensity distribution of the laser beam with which the optical surface is irradiated. For example, in an optical system where a diffraction grating is placed on an optical path, bumps and dips corresponding to a striped intensity distribution pattern generated by the diffraction grating may appear on each lens surface in the optical system. Regarding a lens having ring-shaped steps on one surface of the lens, concentric burns and dips matching with shadows of the ring-shaped steps are formed on the other surface of the lens. If an optical surface is irradiated with a blue laser beam having a profile of an elliptical intensity distribution, an elliptical depression may appear on the optical surface, and thereby deterioration of the optical performance is caused such that astigmatism varies in the longer axis direction of the elliptical shape. The bumps and dips (depression) are caused by contraction of a part of the base material where alteration and decomposition have been caused by the photocatalysis of the functional film. From a correlation between the minute change in shape of the optical surface and the deterioration of the optical performance, it is considered that one of direct factors for causing the deterioration of the optical performance is the minute change in shape of the optical surface.

In the following, an optical system of an optical pick-up according an embodiment of the invention and an optical information recording/reproducing apparatus in which the optical system of an optical pick-up is mounted are explained with reference to the accompanying drawings.

FIG. 1 is a block diagram generally illustrating a configuration of an optical system of an optical pick-up 100 to be mounted on an optical information recording/reproducing apparatus according to the embodiment of the invention. The optical information recording/reproducing apparatus according to the embodiment is configured to record information to and/or reproduce information from a high-density optical disc (hereafter, simply referred to as an "optical disc D0") complying with a BD standard.

As shown in FIG. 1, the optical system of an optical pick-up 100 includes a light source 1, a half mirror 2, a collimator lens 3, an objective lens 4 and a photoreceptor 5. In FIG. 1, a chain line indicates a reference axis AX of the optical system of an optical pick-up 100, and a thin solid line indicates a light beam proceeding to the optical disc D0 and a returning light beam from the optical disc D0.

The optical disc D0 has a protective layer and a recording layer (not shown). In actuality, in the optical disc D0, the recording layer is sandwiched by the protective layer and a substrate layer (or a label layer). The information recording or information reproducing is executed by letting the laser beam from the light source 1 enter the recording layer of the optical disc D0 in a state where the optical disc D0 is placed on a turn table (not shown).

The light source 1 is a semiconductor laser which emits blue laser light having a design wavelength of 406 nm. In general, an oscillation wavelength $\lambda$ (unit: nm) of Fabry-Perot type semiconductor laser used for an optical system of an optical pick-up fluctuates within a range of several nm to several tens of nm (e.g., 400-410 nm) depending on individual differences and use environments of the semiconductor lasers.

As shown in FIG. 1, the laser beam emitted by the light source 1 is deflected by the half mirror 2 to be incident on the collimator lens 3. The laser beam which has entered the collimator lens 3 is converted by the collimator lens 3 into a collimated beam, and then is incident on a first surface 41 of the objective lens 4. The laser beam which has entered the objective lens 4 through the first surface 41 exits from the objective lens 4 through a second surface 42, and converges in the vicinity of the recording layer of the optical disc D0, for which the information recording or information reproducing is executed, so as to form a suitable beam spot with a small amount of aberration on the recording layer of the optical disc D0. The laser beam reflects from the recording layer of the optical disc D0, and returns along the same optical path along which the laser beam proceeds to the optical disc D0. Then, the returning laser beam is received by the photoreceptor 5 through the half mirror 2.

The photoreceptor 5 executes photoelectric conversion for the received laser beam to generate an analog signal, and outputs the analog signal to a signal processing circuit (not shown). The signal processing circuit executes an error correction process while converting the analog signal into a bit stream. Then, the signal processing circuit separates streams (e.g., an audio stream and a video stream) from the bit stream for which the error correction has been executed, and decodes each separated stream. Then, the signal processing circuit converts an audio signal and a video signal which have been obtained by decoding, into analog signals to be output through a speaker and a display (not shown), respectively. Thus, audio and video recorded in the optical disc D0 are reproduced through the speaker and the display.

The objective lens 4 is configured such that a numerical aperture thereof on the optical disc side at the wavelength $\lambda$ falls, for example, within a range from 0.8 to 0.87 so that the information recording and information reproducing can be suitably executed.

Each of the collimator lens 3 and the objective lens 4 is a resin lens made of synthetic resin by molding. Since a resin lens is lighter in weight than a glass lens, it is possible to reduce a load to be placed on an actuator for driving a lens (not shown) by employing a resin lens. Furthermore, a resin lens has a glass transition temperature which is considerably lower than that of a glass lens. Therefore, a resin lens can be molded in a lower temperature condition and can be manufactured more easily than a glass lens. Consequently, the amount of energy consumption for manufacturing of a resin lens is lower than that of a glass lens. Furthermore, a resin lens hardly becomes cracked and can be handled easily. Therefore, resin lenses are suitable for cost reduction by mass production.

As material of each of the collimator lens 3 and the objective lens 4, resin having a refractive index n of 1.4 to 1.7 at the wavelength $\lambda$ is selected. As described below, when an optical surface of an optical element (e.g., the collimator lens 3 or the objective lens 4) is coated with an antireflection film, a minute change in shape may be caused by photocatalyst on the coated optical surface in a high temperature environment. Such a change in shape on the optical surface frequently occurs when the glass transition temperature Tg of the resin forming the collimator lens 3 or the objective lens 4 is relatively low (e.g., when Tg is lower than or equal to 115° C.). For this reason, as base materials of the collimator lens 3 and the objective lens 4, resin having the glass transition temperature Tg higher than 115° C. (preferably, higher than 120° C.) is employed. It should be noted that the base material of the collimator lens 3 and the base material of the objective lens 4 may be the same type of resin or may be different types of resins.

Both surfaces of the collimator lens 3 are coated with antireflection films. Optionally, one of or both of surfaces of the objective lens 4 may be coated with an antireflection film on an as needed basis. The antireflection film formed on the collimator lens 4 or the objective lens 3 is a single layer of a thin dielectric film or multi layers of thin dielectric films. The antireflection film is formed on a lens surface, for example, by sputtering or vacuum deposition. As material of a thin film, dielectric material not containing elements, such as titanium (Ti), tantalum (Ta), hafnium (Hf), zirconium (Zr), niobium (Nb), molybdenum (Mo) or chromium (Cr) which compose a compound inducing a photocatalytic reaction is used. If the optical surface of the objective lens 4 is coated with a thin film containing one or more of these elements (e.g., a titanium oxide film), the thin film is activated by absorption of the blue laser light in a high temperature environment and thereby a chemical reaction is caused in the resin around the thin film. As a result, change in quality and change in shape are caused in the base resin material in the vicinity of the optical surface of the objective lens 4. Since containing the above described elements having photocatalysis has a considerable effect on the change in shape and change in quality in the base material in the vicinity of the coated lens surface, it is necessary to form the antireflection film with material not containing the above described elements in order to increase a lifetime of the collimator lens 3 or the objective lens 4.

For this reason, it is preferable that material not having photocatalysis, such as silicon oxide, aluminum oxide, aluminum fluoride, magnesium fluoride, or a mixture of at least two of the these materials (e.g., a mixture of silicon oxide and aluminum oxide) are used as material of the thin film. The antireflection film formed of such components not having photocatalysis is provided on both surfaces of the collimator lens 3. By providing the antireflection films on both surfaces of the collimator lens 3, it becomes possible to effectively prevent decreasing of the signal level and occurrence of a noise due to undesired reflection. Furthermore, it is preferable to provide the antireflection film having the above described components not having photocatalysis on one of the surfaces of the objective lens 4, and it is more preferable to form the antireflection films having the above described components not having photocatalysis on both surfaces of the objective lens 4. It should be noted that, in regard to an incident angle of the laser beam incident on each of the first surface 41 and the second surface 42, the incident angle changes largely from the central position to the peripheral position on the lens surface (41 or 42). Therefore, reflected light which is reflected from each of the first and second surfaces 41 and 42 diffuses in a wide angle range. As a result, the reflected light from the first and second surfaces 41 and 42 of the objective lens 4 hardly affect the information recording and information reproducing. Therefore, depending on a design condition, it becomes unnecessary to form the antireflection film on the first surface 41 or the second surface 42 of the objective lens 4.

When optical elements in the optical system of an optical pick-up 100 are considered, antireflection films formed on optical surfaces of the optical elements may have the same structure or may have different structures. Furthermore, when one of optical elements in the optical system of an optical pick-up 100 is considered, antireflection films having the same structure or antireflection films having different structures may be formed on optical surfaces of the one of the optical elements. It is preferable that the structure of the antireflection film may be determined, for each of the optical elements or for each of the optical surfaces, depending on the power density of the blue laser light incident on each optical surface or the curvature radius of each optical surface.

Hereafter, concrete examples of the optical system of an optical pick-up 100 according to the embodiment of the invention will be described. Table 1 shows eleven concrete examples (first to eleventh examples) of the optical system of an optical pick-up 100. Table 2 shows structures of antireflection films AR1 to AR 11 used in the first to eleventh examples.

TABLE 1

| | | 1st Example | 2nd Example | 3rd Example | 4th Example | 5th Example | 6th Example |
|---|---|---|---|---|---|---|---|
| Collimator Lens | Surface A | AR11 | AR10 | AR11 | AR11 | AR10 | AR11 |
| | Surface B | AR11 | AR11 | AR11 | AR11 | AR11 | AR11 |
| | Tg | 135° C. | 121° C. | 135° C. | 135° C. | 121° C. | 135° C. |
| | $T_{UV}$ | 77% | 89% | 75% | 76% | 84% | 73% |
| Objective Lens | Surface C | AR1 | AR2 | AR3 | AR4 | AR5 | AR6 |
| | Sueface D | AR10 | AR11 | AR10 | AR11 | AR10 | AR11 |
| | Tg | 121° C. | 121° C. | 121° C. | 121° C. | 121° C. | 135° C. |
| | $T_{UV}$ | 87% | 88% | 88% | 87% | 88% | 76% |
| $\Delta AP^{A-C}$ | | 4.9% | 6.1% | 4.7% | 4.2% | 5.1% | 4.7% |
| $AP_{(BL)}^{A-D}$ | | 95.5% | 96.0% | 94.4% | 96.6% | 91.9% | 97.5% |
| Light-Resisting Property (O: adequate) | | O | O | O | O | O | O |

| | | 7th Example | 8th Example | 9th Example | 10th Example | 11th Example |
|---|---|---|---|---|---|---|
| Collimator Lens | Surface A | AR11 | AR11 | AR10 | AR11 | AR11 |
| | Surface B | AR11 | AR11 | AR11 | AR11 | AR11 |
| | Tg | 121° C. | 121° C. | 121° C. | 135° C. | 121° C. |
| | $T_{UV}$ | 88% | 88% | 85% | 76% | 88% |
| Objective Lens | Surface C | AR7 | AR8 | AR9 | AR1 | AR7 |
| | Sueface D | AR10 | AR10 | AR10 | AR11 | AR10 |
| | Tg | 121° C. | 121° C. | 135° C. | 121° C. | 135° C. |
| | $T_{UV}$ | 88% | 88% | 78% | 87% | 74% |
| $\Delta AP^{A-C}$ | | 6.7% | 5.7% | 6.8% | 4.9% | 6.7% |
| $AP_{(BL)}^{A-D}$ | | 94.3% | 90.8% | 94.8% | 96.9% | 94.3% |
| Light-Resisting Property (O: adequate) | | O | O | O | O | O |

TABLE 2

| Layer No. | | AR1 | AR2 | AR3 | AR4 |
|---|---|---|---|---|---|
| 1st Layer | Material | Silicon Oxide | Silicon Oxide | Silicon Oxide | Silicon Oxide + Aluminum Oxide |
| | n1 | 1.46 | 1.46 | 1.46 | 1.49 |
| | d1 | 31 nm | 51 nm | 51 nm | 67 nm |
| 2nd Layer | Material | Aluminum Oxide | Aluminum Oxide | Aluminum Oxide | Aluminum Oxide |
| | n2 | 1.64 | 1.64 | 1.64 | 1.64 |
| | d2 | 55 nm | 38 nm | 84 nm | 81 nm |
| 3rd Layer | Material | Silicon Oxide | Silicon Oxide | Silicon Oxide | Silicon Oxide |
| | n3 | 1.46 | 1.46 | 1.46 | 1.46 |
| | d3 | 99 nm | 104 nm | 86 nm | 82 nm |
| 4th Layer | Material | | | | |
| | n4 | | | | |
| | d4 | | | | |
| Reflectivity | $R_{BL}$ | 2.5% | 1.9% | 3.6% | 2.8% |
| | $R_{UV}$ | 5.3% | 4.5% | 6.3% | 4.9% |

| Layer No. | | AR5 | AR6 | AR7 | AR8 |
|---|---|---|---|---|---|
| 1st Layer | Material | Silicon Oxide + Aluminum Oxide | Silicon Oxide + Aluminum Oxide | Silicon Oxide | Silicon Oxide |
| | n1 | 1.49 | 1.49 | 1.46 | 1.46 |
| | d1 | 117 nm | 185 nm | 63 nm | 51 nm |
| 2nd Layer | Material | Aluminum Oxide | Aluminum Oxide | Aluminum Oxide | Aluminum Oxide |
| | n2 | 1.64 | 1.64 | 1.64 | 1.64 |
| | d2 | 32 nm | 73 nm | 56 nm | 46 nm |
| 3rd Layer | Material | Silicon Oxide | Silicon Oxide | Silicon Oxide | Silicon Oxide |
| | n3 | 1.46 | 1.46 | 1.46 | 1.46 |
| | d3 | 120 nm | 82 nm | 63 nm | 103 nm |
| 4th Layer | Material | | | Aluminum Oxide | Aluminum Oxide |
| | n4 | | | 1.64 | 1.64 |
| | d4 | | | 23 nm | 15 nm |
| Reflectivity | $R_{BL}$ | 4.7% | 1.9% | 3.7% | 7.3% |
| | $R_{UV}$ | 6.3% | 4.5% | 8.4% | 11.1% |

| Layer No. | | AR9 | AR10 | AR11 |
|---|---|---|---|---|
| 1st Layer | Material | Silicon Oxide | Silicon Oxide | Silicon Oxide |
| | n1 | 1.46 | 1.46 | 1.46 |
| | d1 | 77 nm | 79 nm | 69 nm |
| 2nd Layer | Material | Aluminum Oxide | Aluminum Oxide | Aluminum Oxide |
| | n2 | 1.64 | 1.64 | 1.64 |
| | d2 | 61 nm | 70 nm | 62 nm |
| 3rd Layer | Material | Silicon Oxide | Silicon Oxide | Silicon Oxide |
| | n3 | 1.46 | 1.46 | 1.46 |
| | d3 | 48 nm | 79 nm | 69 nm |
| 4th Layer | Material | Aluminum Oxide | | |
| | n4 | 1.64 | | |
| | d4 | 23 nm | | |
| Reflectivity | $R_{BL}$ | 1.7% | 1.7% | 0.2% |
| | $R_{UV}$ | 5.0% | 4.4% | 1.3% |

In each of the first to eleventh examples, each optical surface of the collimator lens 3 or the objective lens 4 is provided with a triple-layer or four-layer dielectric multi-layer film (antireflection film). In the following explanation, optical surfaces of the collimator lens 3 and the objective lens 4 are respectively referred to as a surface A (31), a surface B (32), a surface C (41) and a surface D (42) which are arranged in this order from the light source side (see FIG. 1). That is, the surface A (31) and the surface B (32) respectively represent optical surfaces of the collimator lens 31, and the surface C (41) and the surface D (42) respectively represent optical surfaces of the objective lens 4. Each optical surface of the collimator lens 3 and the objective lens 4 is coated with one of the eleven kinds of antireflection films AR1 to AR11. Each of the antireflection films AR1 to AR11 is defined by the material (refractive index) and the thickness of each of layers forming the film. Table 2 shows the film structure (material, refractive indexes n1 to n4, and the thicknesses d1 to d4 (unit: nm) of the layers) and a reflection property (reflectivity $R_{UV}$, $R_{BL}$ (unit: %)) of each of the antireflection films AR1 to AR11. The refractive indexes n1 to n4 show refractive indexes of the respective dielectric layers (first to fourth layers) and the thicknesses d1 to d4 show thicknesses of the respective dielectric layers (first to fourth layers).

The reflectivity $R_{UV}$ means a reflectivity of an antireflection film for ultraviolet light having the wavelength of $\lambda_{UV}$ ($\lambda_{UV}$=365 nm) perpendicularly incident on the antireflection film, and the reflectivity $R_{BL}$ means a reflectivity of the antireflection film for blue light having the wavelength of $\lambda_{BL}$ ($\lambda_{BL}$=405 nm) perpendicularly incident on the antireflection film.

As shown in Table 1, the materials (resin) used as the base material of the collimator lens 3 and the objective lens 4 are different between the first to eleventh examples, and combinations of antireflection films formed on the optical surfaces are different between the first to eleventh examples. In Table 1, the types of the antireflection films provided on each optical surface, the glass transition temperature Tg and the internal transmissivity $T_{UV}$ (unit: %) at the wavelength of $\lambda_{UV}$ of the resin material of the base material of the lens, and cumulative surface transmissivity difference $\Delta AP^{A-C}$ (unit: %) and the cumulative surface transmissivity $AP_{(BL)}^{A-D}$ (unit: %) at the wavelength $\lambda_{BL}$ of the optical system of an optical pick-up 100 are shown. The internal transmissivity $T_{UV}$ means an internal transmissivity defined when ultraviolet light having the wavelength of 365 nm passes through the resign material having the thickness of 3 mm.

The cumulative surface transmissivity difference $\Delta AP^{A-C}$ (unit: %) and the cumulative surface transmissivity $AP_{(BL)}^{A-D}$ (and $AP_{(UV)}^{A-D}$) will now be explained. With respect to a thin film, a surface transmissivity P is a ratio of the intensity of light which has passed through a surface in the thin film with respect to the intensity of the light which is incident on the surface in the thin film. That is, the surface transmissivity P is a property value not including the internal transmissivity T. For example, when a reflectivity of i-th surface is defined as $R_{(BL)i}$ for the laser beam of the wavelength $\lambda_{BL}$, the surface transmissivity $P_{(BL)i}$ (unit: %) of the i-th surface is represented by the following equation.

$$P_{(BL)i} = 100 - R_{(BL)i}$$

In this specification, a product of the surface transmissivities $P_{(BL)i}$ of the first to n-th optical surfaces through which the light beam having, for example, the wavelength $\lambda_{BL}$ passes is referred to as the cumulative surface transmissivity $AP_{(BL)}$. For example, when the surface A (31) is defined as the first surface, the surface D (42) is defined as the n-th surface (n=4), and the cumulative surface transmissivity from the surfaces A (31) to the surface D (42) is defined as $AP_{(BL)}^{A-D}$, $AP_{(BL)}^{A-D}$ is calculated by the following equation.

$$AP_{(BL)}^{A-D} = 100 \prod_{i=1}^{n} \frac{P_{(BL)i}}{100} = 100 \prod_{i=1}^{n} \left(1 - \frac{R_{(BL)i}}{100}\right)$$

The cumulative surface transmissivity AP is an approximate transmissivity obtained by neglecting absorption and multiple reflection (including dispersion) to be included in an actual transmissivity of an optical system. Since the cumulative surface transmissivity can be calculated simply from the reflectivity, the cumulative surface transmissivity is a useful parameter particularly in an optical system having a relatively low level of absorption and dispersion. In the optical system of an optical pick-up 100 according to the embodiment, absorption at the wavelength of $\lambda_{BL}$ is negligible. Therefore, the calculated value of the cumulative surface transmissivity $AP_{(BL)}^{A-D}$ is in good agreement with the transmissivity obtained when the light beam having the wavelength of $\lambda_{BL}$ actually passes through the collimator lens 3 and the objective lens 4. Regarding the ultraviolet light beam having the wavelength of $\lambda_{UV}$, the internal transmissivity $T_{UV}$ becomes slightly smaller (see Table 2). However, according to the embodiment, since the distance by which the light beam passes through the optical element (resin) is short, the cumulative surface transmissivity $AP_{(UV)}$ serves as an appropriate indicator for representing an actual transmissivity.

Incidentally, of all of the optical surfaces (the surfaces A to D) of the collimator lens 3 and the objective lens 4, the surface D (42) is characterized that the beam diameter of the laser beam becomes smallest on the on the surface D (42) and the power density of the laser beam becomes highest on the surface D (42). Therefore, the possibility that deterioration of an optical surface is caused by a long time exposure to the blue laser becomes highest on the surface D (42). Such deterioration of an optical surface occurs most frequently when the laser beam is converged such that the power density on the exit surface (surface D (42)) of the objective lens 4 is larger than or equal to a five-hold value of the power density on the exit surface (surface B (32)) of the collimator lens 3. For this reason, in order to secure an appropriate light-resisting property of the optical system of an optical pick-up 100, it becomes important to control power of the laser beam incident on the surface D (42). The power of the laser beam incident on the surface D (42) is approximately in proportion to the cumulative surface transmissivity $AP_{(BL)}^{A-C}$ of the optical surfaces A to C. Since the surface C is the (n-1)-th surface, $AP_{(BL)}^{A-C}$ is represented by the following equation.

$$AP_{(BL)}^{A-C} = 100 \prod_{i=1}^{n-1} \frac{P_{(BL)i}}{100} = 100 \prod_{i=1}^{n-1} \left(1 - \frac{R_{(BL)i}}{100}\right)$$

In this specification, the difference between the cumulative surface transmissivity $AP_{(UV)}$ for ultraviolet light having the wavelength of $\lambda_{UV}$ and the cumulative surface transmissivity $AP_{(BL)}$ for the blue light having the wavelength of $\lambda_{BL}$ is referred to as the cumulative surface transmissivity difference $\Delta AP^{A-C}$. The cumulative surface transmissivity difference $\Delta AP^{A-C}$ can be expressed by an equation indicated below. It should be noted that as the cumulative surface transmissivity difference $\Delta AP^{A-C}$ increases, a component of light of the wavelength $\lambda_{UV}$ is suppressed further with respect to a component of light having the wavelength $\lambda_{BL}$ in regard to the light beam incident on the surface D (42).

$$\Delta AP^{A-C} = AP_{(BL)}^{A-C} - AP_{(UV)}^{A-C} = 100 \prod_{i=1}^{n-1} \frac{P_{(BL)i}}{100} - 100 \prod_{i=1}^{n-1} \frac{P_{(UV)i}}{100} =$$
$$100 \left\{ \prod_{i=1}^{n-1} \left(1 - \frac{R_{(BL)i}}{100}\right) - \prod_{i=1}^{n-1} \left(1 - \frac{R_{(UV)i}}{100}\right) \right\}$$

Since the blue light of the wavelength $\lambda_{BL}$ is signal light of the optical system of an optical pick-up 100, the blue light needs to be kept at a predetermined intensity, and it is preferable that the optical system of an optical pick-up 100 achieves a low loss of power for the light beam of the wavelength of $\lambda_{BL}$. Since the ultraviolet light of the wavelength of $\lambda_{UV}$ is merely a noise component of the light beam but affects considerably deterioration of the optical surface (namely, the surface D (42)), it is preferable that the optical system of an optical pick-up 100 is designed to achieve a high loss of power for the light beam having the wavelength of $\lambda_{UV}$. Therefore, it is preferable that the cumulative surface transmissivity difference $\Delta AP^{A-C}$ has a large value. Specifically, when $\Delta AP^{A-C}$ is set to be larger than or equal to 5%, change in shape of an optical surface decreases appropriately. When $\Delta AP^{A-C}$ is set to be larger than or equal to 7%, a required light-resisting property can be secured in a wide range of design condition. When $\Delta AP^{A-C}$ is set to be larger than or equal to 10%, an appropriate light-resisting property can be secured even in a strict use temperature condition. When $\Delta AP^{A-C}$ is set to be larger than or equal to 15%, a required light-resisting property can be secured in a further wider range of design condition. By setting the reflectivity $R_{UV}$ of the antireflection film to be high for the light of the wavelength of $\lambda_{UV}$, it becomes possible to set $\Delta AP^{A-C}$ to be high. However, the reflectivity $R_{BL}$ for the light of the wavelength $\lambda_{BL}$ also increases in conjunction with increase of the reflectivity $R_{UV}$. Therefore, when the reflectivity $R_{UV}$ is set to be excessively high, the transmissivity for the light of the wavelength of $\lambda_{BL}$ decreases considerably, and thereby the basic optical performance of the optical system of an optical pick-up 100 may decrease. Therefore, it is important to configure the antireflection film such that $\Delta AP^{A-C}$ has a high value while keeping the cumulative surface transmissivity $AP_{(BL)}^{A-D}$ for the light of the wavelength $\lambda_{BL}$ at a constant value (preferably, 90% or more).

The power density of the laser beam of the wavelength $\lambda_{UV}$ incident on the surface D (42) decreases and thereby change in shape becomes hard to occur not only in the case where the transmissivity of the surfaces A-C are high, but also in the case where the internal transmissivity $T_{UV}$ of the collimator lens 3 is low for the laser beam of the wavelength $\lambda_{UV}$. When the resin having the internal transmissivity $T_{UV}$ of 90% or less for the light beam of the wavelength $\lambda_{UV}$ is used as the base material of the collimator lens 3, an appropriate effect of suppressing the change in shape of the optical surface appears. As shown in Table 1, in all of the first to eleventh examples, the material of the collimator lens 3 is selected so that the internal transmissivity $T_{UV}$ of the collimator lens 3 with respect to the ultraviolet light of the wavelength $\lambda_{UV}$ is lower than or equal to 90%.

As shown in the first, third, fourth, sixth, eight and tenth examples, when the resin having the internal transmissivity $T_{UV}$ of 80% or less is used as the base material of the collimator lens 3, a required light-resisting property can be secured in a wide range of design condition. When the internal transmissivity $T_{UV}$ of the base material of the collimator lens 3 is sufficiently low, it becomes possible to decrease the power density of the laser beam of the wavelength $\lambda_{BL}$ passing through the surface D (42), to the extent that a required light-resisting property can be secured, even if the cumulative surface transmissivity difference $\Delta AP^{A-C}$ is slightly lower than the value discussed above. For example, when the resin having the internal transmissivity $T_{UV}$ of 80% or less is used as the base material of the collimator lens 3, a sufficient light-resisting property can be secured if the cumulative surface transmissivity difference $\Delta AP^{A-C}$ is larger than or equal to 4% (see the first, third, fourth, sixth and tenth examples).

As shown in Table 1, in each of the first to eleventh examples, the resin having the glass transition temperature of 120° C. or more is used for the base material of the collimator lens 3 and the objective lens 4. One of factors that cause the change in shape of an optical surface on which a functional film is provided is local increase of temperature of resin in the vicinity of the functional film caused by reaction heat due to photocatalysis or heat generated by absorption of the laser light in the functional film. For this reason, it is preferable to use the resin having the high glass transition temperature as material of the collimator lens 3 and the objective lens 4 in regard to prevention of change in shape of the optical surface.

When the resin having the glass transition temperature of 115° C. or less is used, the frequency of occurrence of change in shape of the optical surface becomes high. On the other hand, when the resin having the glass transition temperature of 120° C. or more is used, the frequency of occurrence of change in shape of the optical surface becomes considerably low. For this reason, it is important to use the resign having the glass transition temperature of 115° C. or more as the base material of the collimator lens 3 and the objective lens 4. It is desirable to use the resign having the glass transition temperature of 120° C. or more as the base material of the collimator lens 3 and the objective lens 4.

Hereafter, the structures of the antireflection films employed in the examples are explained in detail. As shown in Table 1, each of the antireflection films AR1 to AR 11 is a multilayer film configured such that a lower refractive index layer (e.g., n<1.5) and a higher refractive index layer (e.g., n>1.6) are alternately arranged from the bottom layer (i.e., a layer (the first layer) nearest to the base material). The antireflection films AR7 to AR9 are four-layer films, and the others are three-layer films. The antireflection films AR1 to AR9 are optimized as coatings for an objective lens, and the antireflection films AR10 and AR11 are optimized as coatings for a collimator lens. The antireflection films other than AR4 to AR6 are configured to use silicon oxide as material for a lower refractive index layer and to use aluminum oxide as material for a higher refractive index layer. Regarding the antireflection films AR4 to AR6, material made by adding a slight amount of aluminum oxide to silicon oxide is used for the first layer contacting the base material. By addition of aluminum oxide, the refractive index of the first layer is set to be slightly higher than that of the material made of silicon oxide only. It should be noted that the antireflection films AR1 to AR3, AR10 and AR11 have the same basic structure excepting the fact that thicknesses of the layers are different from each other between the antireflection films AR1 to AR3, AR10 and AR11. Similarly, antireflection films AR4 to AR6 have the same basic structure excepting the fact that thicknesses of the layers are different from each other between the antireflection films AR4 to AR6, and antireflection films AR7 to AR9 have the same basic structure excepting the fact that thicknesses of the layers are different from each other between the antireflection films AR7 to AR9.

As clearly shown in Table 1, the antireflection films AR1 to AR11 do not contain titanium (Ti), tantalum (Ta), hafnium (Hf), zirconium (Zr), niobium (Nb), molybdenum (Mo) or chromium (Cr) which compose a compound having photocatalysis. Therefore, the antireflection films AR1 to AR11 do not change the quality of the base material by photocatalysis. Furthermore, since each of the antireflection films AR1 to AR11 consists only of silicon oxide and aluminum oxide which do not exhibit a photocatalytic reaction, the antireflection films AR1 to AR11 do not cause photocatalysis which would occur by absorption of the laser beam, and therefore the base material is prevented from being changed in shape.

In general, a diffraction grating for dividing the laser from the light source 1 is placed between the light source 1 and the collimator lens 3, and therefore an intensity distribution is caused on the optical surface of the collimator lens 3 by diffracted light produced by the diffraction grating. Therefore, when the light-resisting property with respect to the blue laser is low, change in shape occurs on the collimator lens 3 on which the blue laser impinges in a high temperature environment, and thereby the optical performance decreases considerably. By contrast, in each of the examples shown in Table 1, the coating which exhibits an excellent property for the blue laser light is provided on each optical surface of the collimator lens 3, the deterioration of the optical performance due to the intensity distribution of light hardly occurs. Therefore, the change in shape of the optical surface of the collimator lens 3 does not occur during a light-resisting property test, and thereby it becomes possible to suppress fluctuation of the aberrations during the test of the optical system of an optical pick-up 100.

In each of the examples, the antireflection film is configured such that the refractive index of the higher refractive index layer is lower than 1.7, and the difference in refractive index between the lower refractive index layer and the higher refractive index layer is lower than or equal to 0.2. Since the film having the photocatalysis contains metal exhibiting a high refractive index, the antireflection films are configured as described above. It should be noted that the photocatalytic reaction becomes more noticeable when a film including a higher refractive index layer having a refractive index higher than 1.7 is formed on the exit surface of the objective lens 4 (surface D) on which the light beam having the power density larger than or equal to a five-hold value of the power density on the exit surface (the surface B) of the collimator lens 3 is converged.

It is preferable that the antireflection film formed on the exit surface (surface D) has a wavelength property where, within a wavelength range of 350 nm to 750 nm, the wavelength at which the reflectivity becomes smallest lies between 430 and 600 nm. When such an antireflection film is formed on the exit surface of the objective lens, the transmissivity besoms higher around the wavelength of $\lambda_{BL}$, which is advantageous in regard to securing a proper light amount.

By conducting the light-resisting evaluation test (30 mW/mm$^2$, 75° C.×1000 hours) for each optical system of an optical pick-up according to each of the examples, it has been confirmed that all of the first to eleventh examples maintain the optical performance satisfying the specifications after the test has finished, and that the optical system of an optical pickup 100 has an adequate light-resisting property.

<Test Condition>
Laser Emission Condition
Wavelength: $\lambda_{BL}$=405 nm
Output: 30 mW/mm$^2$ (continuous oscillation)
Ambient Temperature: 75° C.
Testing Time: 1000 hours Although the present invention has been described in considerable detail with reference to certain preferred embodiments thereof, other embodiments are possible. For example, in another embodiment, a collimating optical system may be formed of a plurality of optical elements. The collimating optical system may include a plurality of lenses, and may include an optical element (e.g., a polarizer or a phase plate) which is not a lens.

In the optical system of an optical pick-up 100, the position of the collimator lens 3 along the optical axis may be adjusted to correct the spherical aberration that would occur due to, for example, difference in thickness of the cover layer of the optical disc, the difference in wavelength or the temperature variations. It should be noted that, in the case where the collimator lens 3 is shifted from the state shown in FIG. 2 to correct the spherical aberration, the collimator lens 3 may be expressed as an optical element that converts the laser beam emitted by the light source 1 into a substantially collimated beam.

Figure 2:
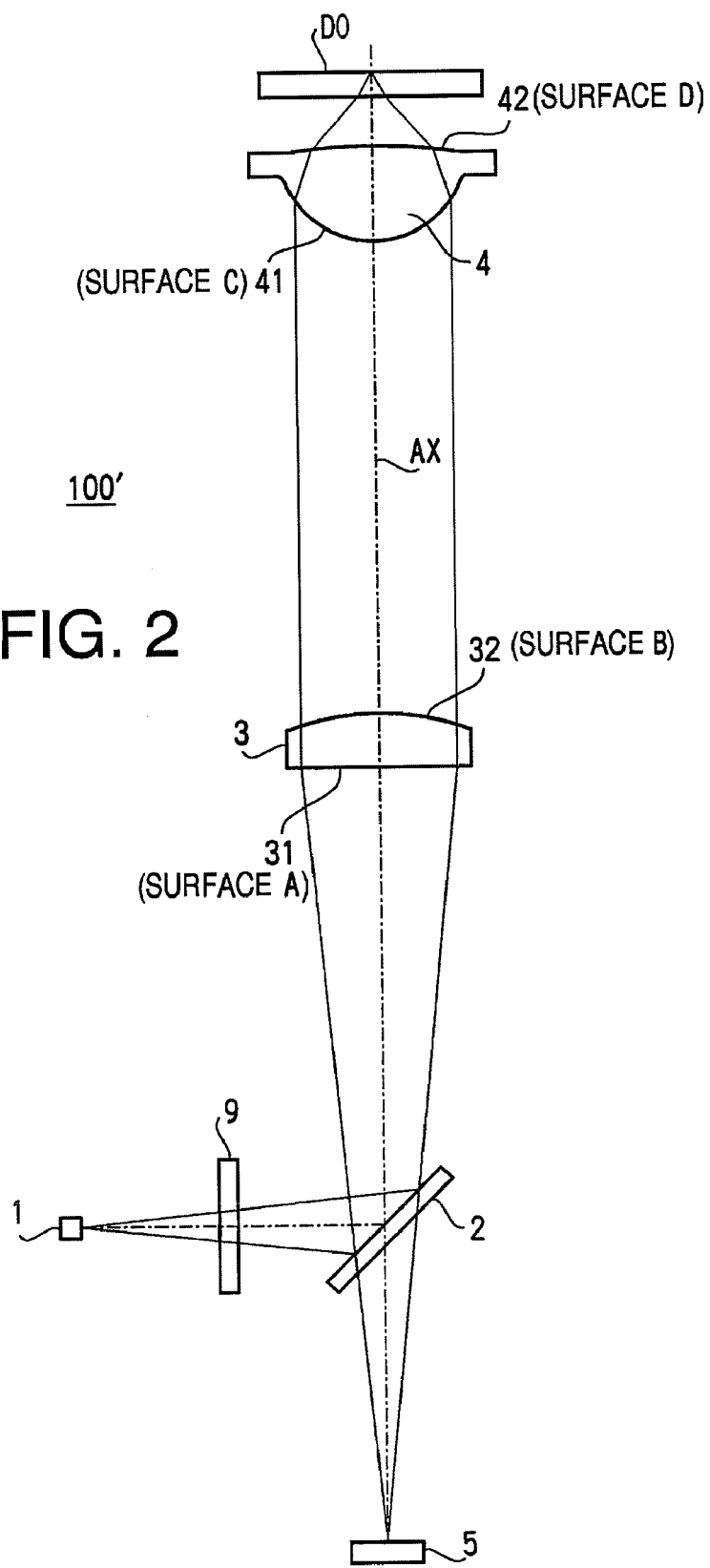
FIG. 2 shows an example of a configuration of an optical system of an optical pick-up where a diffraction grating is placed between a light source and a collimator lens.

FIG. 2 shows an example of a configuration of an optical system of an optical pick-up 100' where a diffraction grating 9 is placed between the light source 1 and the collimator lens 3.

This application claims priority of Japanese Patent Applications No. P2009-225780 filed on Sep. 30, 2009 and No. P2010-169908 filed on Jul. 29, 2010. The entire subject matter of the applications is incorporated herein by reference.

What is claimed is:

1. An optical information recording/reproducing optical system for recording information to and/or reproducing information from an optical disc by letting a laser beam impinge on a recording layer of the optical disc, comprising:
a light source that emits the laser beam;
an optical element that converts the laser beam emitted by the light source into a substantially collimated beam; and
an objective lens that converges the laser beam emerging from the optical element onto the recording layer of the optical disc,
wherein:
a wavelength λ (unit: nm) of the laser beam falls within a range defined by a following condition:

$$400<\lambda<410 \quad (1),$$

the optical element and the objective lens are made of same resin materials or different resin materials having a glass transition temperature Tg satisfying a condition:

$$Tg>115° C. \quad (2),$$

each of optical surfaces of the optical element and the objective lens is configured not to have an optical thin film which contains at least one of elements of titanium (Ti), tantalum (Ta), hafnium (Hf), zirconium (Zr), niobium (Nb), molybdenum (Mo) and chromium (Cr),
each of optical surfaces of the optical element is provided with an antireflection film which is made of one of silicon oxide, aluminum oxide, aluminum fluoride and magnesium fluoride or a mixture of at least two of silicon oxide, aluminum oxide, aluminum fluoride and magnesium fluoride,
when optical surfaces from an optical surface to which the laser beam emerging from the light source enters to an exit surface of the objective lens are defined as i-th surfaces (i=1, 2, 3, . . . , n), a reflectivity defined when light having a wavelength $\lambda_{UV}$ ($\lambda_{UV}$=365 nm) is incident perpendicularly on i-th optical surface is represented as $R_{UVi}$ (unit: %) and a reflectivity defined when light having a wavelength $\lambda_{BL}$ ($\lambda_{BL}$=405 nm) is incident perpendicularly on i-th optical surface is represented as $R_{BLi}$ (unit: %), the optical information recording/reproducing optical system satisfies a condition:

$$\prod_{i=1}^{n-1}\left(1-\frac{R_{(BL)i}}{100}\right)-\prod_{i=1}^{n-1}\left(1-\frac{R_{(UV)i}}{100}\right)>0.05. \quad (3)$$

2. The optical information recording/reproducing optical system according to claim 1,
wherein the optical information recording/reproducing optical system further satisfies a condition:

$$\prod_{i=1}^{n}\left(1-\frac{R_{(BL)i}}{100}\right)>0.90. \quad (4)$$

3. The optical information recording/reproducing optical system according to claim 1,
wherein at least one of optical surfaces of the objective lens is provided with an antireflection film which includes at least a layer made of one of silicon oxide, aluminum oxide, aluminum fluoride and magnesium fluoride or a mixture of at least two of silicon oxide, aluminum oxide, aluminum fluoride and magnesium fluoride.

4. The optical information recording/reproducing optical system according to claim 1, wherein the antireflection film of each of the optical surfaces of the optical element and the objective lens is one of a single layer film and a multilayer film with four layers or less.

5. The optical information recording/reproducing optical system according to claim 1, further comprising a diffraction grating that divides the laser beam from the light source into a plurality of diffracted light beams, the diffraction grating being located between the light source and the optical element.

6. The optical information recording/reproducing optical system according to claim 1,
wherein the antireflection film formed on the exit surface of the objective lens is configured such that, within a wavelength range of 350 nm to 750 nm, a wavelength λmin (unit: nm) at which a reflectivity of the antireflection film formed on the exit surface becomes smallest in a state where the laser beam is incident on the antireflection film formed on the exit surface perpendicularly satisfies a condition:

$$430 < \lambda min < 600 \tag{7}$$

7. The optical information recording/reproducing optical system according to claim 1,
wherein:
the antireflection film formed on at least one of the optical surfaces of the optical element is a three-layer film; and
when layers of the three-layer film are first, second and third layers defined in this order from a base material surface side of the optical element, n1, n2 and n3 respectively represent refractive indexes of materials of the first, second and third layers at a wavelength of $\lambda_{BL}$, and d1, d2 and d3 (unit: nm) respectively represent thicknesses of the first, second and third layers, the refractive indexes n1, n2 and n3 and the thicknesses d1, d2 and d3 satisfy following conditions:

| first layer:  | $1.55 \geq n1$,        | $30 \leq d1 \leq 150$  |
| second layer: | $1.55 < n2 \leq 1.70$, | $40 \leq d2 \leq 100$  |
| third layer:  | $1.55 \geq n3$,        | $30 \leq d3 \leq 150$. |

8. The optical information recording/reproducing optical system according to claim 1,
wherein:
the antireflection film formed on at least one of the optical surfaces of the objective lens is a three-layer film; and
when layers of the three-layer film are fourth, fifth and sixth layers defined in this order from a base material surface side of the objective lens, n4, n5 and n6 respectively represent refractive indexes of materials of the fourth, fifth and sixth layers at a wavelength of $\lambda_{BL}$, and d4, d5 and d6 (unit: nm) respectively represent thicknesses of the fourth, fifth and sixth layers, the refractive indexes n4, n5 and n6 and the thicknesses d4, d5 and d6 satisfy following conditions:

| fourth layer: | $1.55 \geq n4$,        | $30 \leq d4 \leq 200$  |
| fifth layer:  | $1.55 < n5 \leq 1.70$, | $30 \leq d5 \leq 100$  |
| sixth layer:  | $1.55 \geq n6$,        | $40 \leq d6 \leq 150$. |

9. The optical information recording/reproducing optical system according to claim 1,
wherein:
the antireflection film formed on at least one of the optical surfaces of the objective lens is a four-layer film; and
when layers of the four-layer film are seventh, eighth, ninth and tenth layers defined in this order from a base material surface side of the objective lens, n7, n8, n9 and n10 respectively represent refractive indexes of materials of the seventh, eighth, ninth and tenth layers at a wavelength of $\lambda_{BL}$, and d7, d8 d9 and d10 (unit: nm) respectively represent thicknesses of the seventh, eighth, ninth and tenth layers, the refractive indexes n7, n8, n9 and n10 and the thicknesses d7, d8, d9 and d10 satisfy following conditions:

| seventh layer: | $1.55 \geq n7$,         | $10 \leq d7 \leq 100$   |
| eighth layer:  | $1.55 < n8 \leq 1.70$,  | $30 \leq d8 \leq 150$   |
| ninth layer:   | $1.55 \geq n9$,         | $40 \leq d9 \leq 100$   |
| tenth layer:   | $1.55 < n10 \leq 1.70$, | $30 \leq d10 \leq 100$. |

10. An optical information recording/reproducing optical system for recording information to and/or reproducing information from an optical disc by letting a laser beam impinge on a recording layer of the optical disc, comprising:
a light source that emits the laser beam;
an optical element that converts the laser beam emitted by the light source into a substantially collimated beam; and
an objective lens that converges the laser beam emerging from the optical element onto the recording layer of the optical disc,
wherein:
a wavelength λ (unit: nm) of the laser beam falls within a range defined by a following condition:

$$400 < \lambda < 410 \tag{1},$$

the optical element and the objective lens are made of same resin materials or different resin materials having a glass transition temperature Tg satisfying a condition:

$$Tg > 115° C. \tag{2},$$

each of optical surfaces of the optical element and the objective lens is configured not to have an optical thin film which contains at least one of elements of titanium (Ti), tantalum (Ta), hafnium (Hf), zirconium (Zr), niobium (Nb), molybdenum (Mo) and chromium (Cr),
each of optical surfaces of the optical element is provided with an antireflection film which is made of one of silicon oxide, aluminum oxide, aluminum fluoride and magnesium fluoride or a mixture of at least two of silicon oxide, aluminum oxide, aluminum fluoride and magnesium fluoride,
when $T_{UV}$ represents an internal transmissivity defined when light having the wavelength of $\lambda_{UV}$ passes through the resin material of the optical element by a path length of 3 mm, the internal transmissivity $T_{UV}$ satisfies a condition:

$$T_{UV} < 0.8 \tag{5, and}$$

when optical surfaces from an optical surface to which the laser beam emerging from the light source enters to an exit surface of the objective lens are defined as i-th surfaces (i=1, 2, 3, . . . , n), a reflectivity defined when light having a wavelength $\lambda_{UV}$ ($\lambda_{UV}$=365 nm) is incident perpendicularly on i-th optical surface is represented as $R_{UVi}$ (unit: %) and a reflectivity defined when light having a wavelength $\lambda_{BL}$ ($\lambda_{BL}$=405 nm) is incident perpendicularly on i-th optical surface is represented as $R_{BLi}$ (unit: %), the optical information recording/reproducing optical system satisfies a condition:

$$\prod_{i=1}^{n-1}\left(1-\frac{R_{(BL)i}}{100}\right) - \prod_{i=1}^{n-1}\left(1-\frac{R_{(UV)i}}{100}\right) > 0.04. \quad (6)$$

11. An optical information recording/reproducing apparatus for recording information to and/or reproducing information from an optical disc by letting a laser beam impinge on a recording layer of the optical disc, comprising an optical information recording/reproducing optical system,
the optical information recording/reproducing optical system including:
a light source that emits the laser beam;
an optical element that converts the laser beam emitted by the light source into a substantially collimated beam; and
an objective lens that converges the laser beam emerging from the optical element onto the recording layer of the optical disc,
wherein:
a wavelength λ (unit: nm) of the laser beam falls within a range defined by a following condition:

$$400<\lambda 410 \quad (1),$$

the optical element and the objective lens are made of same resin materials or different resin materials having a glass transition temperature Tg satisfying a condition:

$$Tg>115° C. \quad (2),$$

each of optical surfaces of the optical element and the objective lens is configured not to have an optical thin film which contains at least one of elements of titanium (Ti), tantalum (Ta), hafnium (Hf), zirconium (Zr), niobium (Nb), molybdenum (Mo) and chromium (Cr),
each of optical surfaces of the optical element is provided with an antireflection film which is made of one of silicon oxide, aluminum oxide, aluminum fluoride and magnesium fluoride or a mixture of at least two of silicon oxide, aluminum oxide, aluminum fluoride and magnesium fluoride,
when optical surfaces from an optical surface to which the laser beam emerging from the light source enters to an exit surface of the objective lens are defined as i-th surfaces (i=1, 2, 3, . . . , n), a reflectivity defined when light having a wavelength $\lambda_{UV}$ ($\lambda_{UV}$=365 nm) is incident perpendicularly on i-th optical surface is represented as $R_{UVi}$ (unit: %) and a reflectivity defined when light having a wavelength $\lambda_{BL}$ ($\lambda_{BL}$=405 nm) is incident perpendicularly on i-th optical surface is represented as $R_{BLi}$ (unit: %), the optical information recording/reproducing optical system satisfies a condition:

$$\prod_{i=1}^{n-1}\left(1-\frac{R_{(BL)i}}{100}\right) - \prod_{i=1}^{n-1}\left(1-\frac{R_{(UV)i}}{100}\right) > 0.05. \quad (3)$$

12. The optical information recording/reproducing apparatus according to claim 11,
wherein the optical information recording/reproducing optical system further satisfies a condition:

$$\prod_{i=1}^{n-1}\left(1-\frac{R_{(BL)i}}{100}\right) > 0.90. \quad (4)$$

13. The optical information recording/reproducing apparatus according to claim 11,
wherein at least one of optical surfaces of the objective lens is provided with an antireflection film which includes at least a layer made of one of silicon oxide, aluminum oxide, aluminum fluoride and magnesium fluoride or a mixture of at least two of silicon oxide, aluminum oxide, aluminum fluoride and magnesium fluoride.

14. The optical information recording/reproducing apparatus according to claim 11,
wherein the antireflection film of each of the optical surfaces of the optical element and the objective lens is one of a single layer film and a multilayer film with four layers or less.

15. The optical information recording/reproducing apparatus according to claim 11, further comprising a diffraction grating that divides the laser beam from the light source into a plurality of diffracted light beams, the diffraction grating being located between the light source and the optical element.

16. The optical information recording/reproducing apparatus according to claim 11,
wherein the antireflection film formed on the exit surface of the objective lens is configured such that, within a wavelength range of 350 nm to 750 nm, a wavelength λmin (unit: nm) at which a reflectivity of the antireflection film form on the exit surface becomes smallest in a state where the laser beam is incident on the antireflection film formed on the exit surface perpendicularly satisfies a condition:

$$430<\lambda min<600 \quad (7).$$

17. The optical information recording/reproducing apparatus according to claim 11,
wherein:
the antireflection film formed on at least one of the optical surfaces of the optical element is a three-layer film; and
when layers of the three-layer film are first, second and third layers defined in this order from a base material surface side of the optical element, n1, n2 and n3 respectively represent refractive indexes of materials of the first, second and third layers at a wavelength of $\lambda_{BL}$, and d1, d2 and d3 (unit: nm) respectively represent thicknesses of the first, second and third layers, the refractive indexes n1, n2 and n3 and the thicknesses d1, d2 and d3 satisfy following conditions:

| first layer: | 1.55 ≧ n1, | 30 ≦ d1 ≦ 150 |
| second layer: | 1.55 < n2 ≦ 1.70, | 40 ≦ d2 ≦ 100 |
| third layer: | 1.55 ≧ n3, | 30 ≦ d3 ≦ 150. |

18. The optical information recording/reproducing apparatus according to claim 11,
wherein:
the antireflection film formed on at least one of the optical surfaces of the objective lens is a three-layer film; and
when layers of the three-layer film are fourth, fifth and sixth layers defined in this order from a base material surface side of the objective lens, n4, n5 and n6 respectively represent refractive indexes of materials of the fourth, fifth and sixth layers at a wavelength of $\lambda_{BL}$, and d4, d5 and d6 (unit: nm) respectively represent thicknesses of the fourth, fifth and sixth layers, the refractive indexes n4, n5 and n6 and the thicknesses d4, d5 and d6 satisfy following conditions:

| | | |
|---|---|---|
| fourth layer: | $1.55 \geq n4$, | $30 \leq d4 \leq 200$ |
| fifth layer: | $1.55 < n5 \leq 1.70$, | $30 \leq d5 \leq 100$ |
| sixth layer: | $1.55 \geq n6$, | $40 \leq d6 \leq 150$. |

19. The optical information recording/reproducing apparatus according to claim 11,
wherein:
the antireflection film formed on at least one of the optical surfaces of the objective lens is a four-layer film; and
when layers of the four-layer film are seventh, eighth, ninth and tenth layers defined in this order from a base material surface side of the objective lens, n7, n8, n9 and n10 respectively represent refractive indexes of materials of the seventh, eighth, ninth and tenth layers at a wavelength of $\lambda_{BL}$, and d7, d8 d9 and d10 (unit: nm) respectively represent thicknesses of the seventh, eighth, ninth and tenth layers, the refractive indexes n7, n8, n9 and n10 and the thicknesses d7, d8, d9 and d10 satisfy following conditions:

| | | |
|---|---|---|
| seventh layer: | $1.55 \geq n7$, | $10 \leq d7 \leq 100$ |
| eighth layer: | $1.55 < n8 \leq 1.70$, | $30 \leq d8 \leq 150$ |
| ninth layer: | $1.55 \geq n9$, | $40 \leq d9 \leq 100$ |
| tenth layer: | $1.55 < n10 \leq 1.70$, | $30 \leq d10 \leq 100$. |

20. An optical information recording/reproducing apparatus for recording information to and/or reproducing information from an optical disc by letting a laser beam impinge on a recording layer of the optical disc, comprising an optical information recording/reproducing optical system,
the optical information recording/reproducing optical system including:
a light source that emits the laser beam;
an optical element that converts the laser beam emitted by the light source into a substantially collimated beam; and
an objective lens that converges the laser beam emerging from the optical element onto the recording layer of the optical disc,
wherein:
a wavelength $\lambda$ (unit: nm) of the laser beam falls within a range defined by a following condition:

$$400 < \lambda < 410 \quad (1),$$

the optical element and the objective lens are made of same resin materials or different resin materials having a glass transition temperature Tg satisfying a condition:

$$Tg > 115° C. \quad (2),$$

each of optical surfaces of the optical element and the objective lens is configured not to have an optical thin film which contains at least one of elements of titanium (Ti), tantalum (Ta), hafnium (Hf), zirconium (Zr), niobium (Nb), molybdenum (Mo) and chromium (Cr),
each of optical surfaces of the optical element is provided with an antireflection film which is made of one of silicon oxide, aluminum oxide, aluminum fluoride and magnesium fluoride or a mixture of at least two of silicon oxide, aluminum oxide, aluminum fluoride and magnesium fluoride,
when $T_{UV}$ represents an internal transmissivity defined when light having the wavelength of $\lambda_{UV}$ passes through the resin material of the optical element by a path length of 3 mm, the internal transmisivity $T_{UV}$ satisfies a condition:

$$T_{UV} < 0.8 \quad (5); \text{ and}$$

when optical surfaces from an optical surface to which the laser beam emerging from the light source enters to an exit surface of the objective lens are defined as i-th surfaces (i=1, 2, 3, . . . , n), a reflectivity defined when light having a wavelength $\lambda_{UV}$ ($\lambda_{UV}$=365 nm) is incident perpendicularly on i-th optical surface is represented as $R_{UVi}$ (unit: %) and a reflectivity defined when light having a wavelength $\lambda_{BL}$ ($\lambda_{BL}$=405 nm) is incident perpendicularly on i-th optical surface is represented as $R_{BLi}$ (unit: %), the optical information recording/reproducing optical system satisfies a condition:

$$\prod_{i=1}^{n-1}\left(1 - \frac{R_{(BL)i}}{100}\right) - \prod_{i=1}^{n-1}\left(1 - \frac{R_{(UV)i}}{100}\right) > 0.04. \quad (6)$$

\* \* \* \* \*